United States Patent
Blount et al.

(10) Patent No.: US 6,996,164 B1
(45) Date of Patent: Feb. 7, 2006

(54) SELF-INTERFERENCE REMOVAL USING CONVERTER COMPENSATION IN A RELAYED COMMUNICATION SYSTEM

(75) Inventors: Richard N. Blount, Vista, CA (US); Donald W. Becker, Rancho Santa Fe, CA (US); John H. O'Neill, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 375 days.

(21) Appl. No.: 10/051,887

(22) Filed: Jan. 15, 2002

(51) Int. Cl.
    *H04L 5/16* (2006.01)

(52) U.S. Cl. .................. 375/219; 375/285; 375/346; 379/406.03; 455/37.3; 455/284; 455/326

(58) Field of Classification Search ........... 375/219, 375/222, 261, 285, 296, 298, 340, 346; 379/406.01, 379/406.03, 406.05; 370/286; 455/121, 286, 455/326, 63, 67.1, 67.3
See application file for complete search history.

(56) References Cited

U.S. PATENT DOCUMENTS

| | | | |
|---|---|---|---|
| 5,109,532 A | 4/1992 | Petrovic et al. | |
| 5,280,537 A | 1/1994 | Sugiyama et al. | |
| 5,596,439 A | 1/1997 | Dankberg et al. | |
| 5,625,640 A | 4/1997 | Palmer et al. | |
| 5,860,057 A | 1/1999 | Ishida et al. | |
| 5,894,496 A * | 4/1999 | Jones ........................ | 455/126 |
| 5,896,421 A | 4/1999 | Zamat et al. | |
| 6,009,317 A | 12/1999 | Wynn | |
| 6,011,952 A | 1/2000 | Dankberg et al. | |
| 6,246,865 B1 | 6/2001 | Lee | |
| 6,330,290 B1 * | 12/2001 | Glas ......................... | 375/324 |

OTHER PUBLICATIONS

Cavers et al., "Adaptive Compensation for Imbalance and Offset Losses in Direct Conversion Transceivers," *IEEE Transaction on Vehicular Technology*, 42:4, Nov. 1993.

* cited by examiner

*Primary Examiner*—Dac V. Ha
(74) *Attorney, Agent, or Firm*—Townsend and Townsend and Crew LLP

(57) ABSTRACT

Self-interference cancellation in two-way relayed communications is improved by creating models of upconverter and downconverter imperfections and then compensating for those imperfections before self interference cancellation processing. The model includes compensation for phase offset, for amplitude imbalance and for leakage in the mixers.

27 Claims, 5 Drawing Sheets

US 6,996,164 B1

SELF-INTERFERENCE REMOVAL USING CONVERTER COMPENSATION IN A RELAYED COMMUNICATION SYSTEM

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to improvements in self-interference mitigation in two-way relayed communications, particularly as implemented through a satellite link.

Self-interference cancellation is a theoretically efficient technique for removing interference on a channel containing a remote signal and a near signal in relayed communication between two or more devices involving the transmission of different signals within the same frequency band at the same time. In the example of communication between two devices, such transmission results in a composite signal that includes two signals, one originating from each device. As each device attempts to receive the signal originating from the other device (remote signal), it is hindered by interference caused by the signal originating from itself (near signal). Self-interference removal techniques are used to remove the unwanted near signal wherein the local device typically generates a "cancellation signal" resembling the device's own near signal and then uses the cancellation signal to remove at least a portion of the near signal from the composite signal to obtain a signal closer to the desired remote signal.

A number of representative techniques addressing to the general problem have been disclosed in U.S. Pat. Nos. 5,596,439 and 6,011,952, both issued to Dankberg et al., U.S. Pat. No. 5,280,537 issued to Sugiyama et al., U.S. Pat. No. 5,625,640 issued to Palmer et al., U.S. Pat. No. 5,860,057 issued to Ishida et al., and described in U.S. patent application Ser. Nos. 09/925,410 and 10/006,534 assigned to the assignee of the present application. Known self-interference removal techniques are limited in that there are uncompensated—for imperfections in the subsystems, such as the upconverter and downconverter stages, leaving room for improvement.

SUMMARY OF THE INVENTION

According to the invention, self-interference cancellation in two-way relayed communications is improved by creating models of upconverter and downconverter imperfections and then compensating for those imperfections before self interference cancellation processing. The model includes compensation for phase offset, for amplitude imbalance and for leakage in the mixers.

The invention will be better understood by reference to the following detailed description in connection with the accompanying drawings.

DETAILED DESCRIPTION OF THE INVENTION

Figure 1:
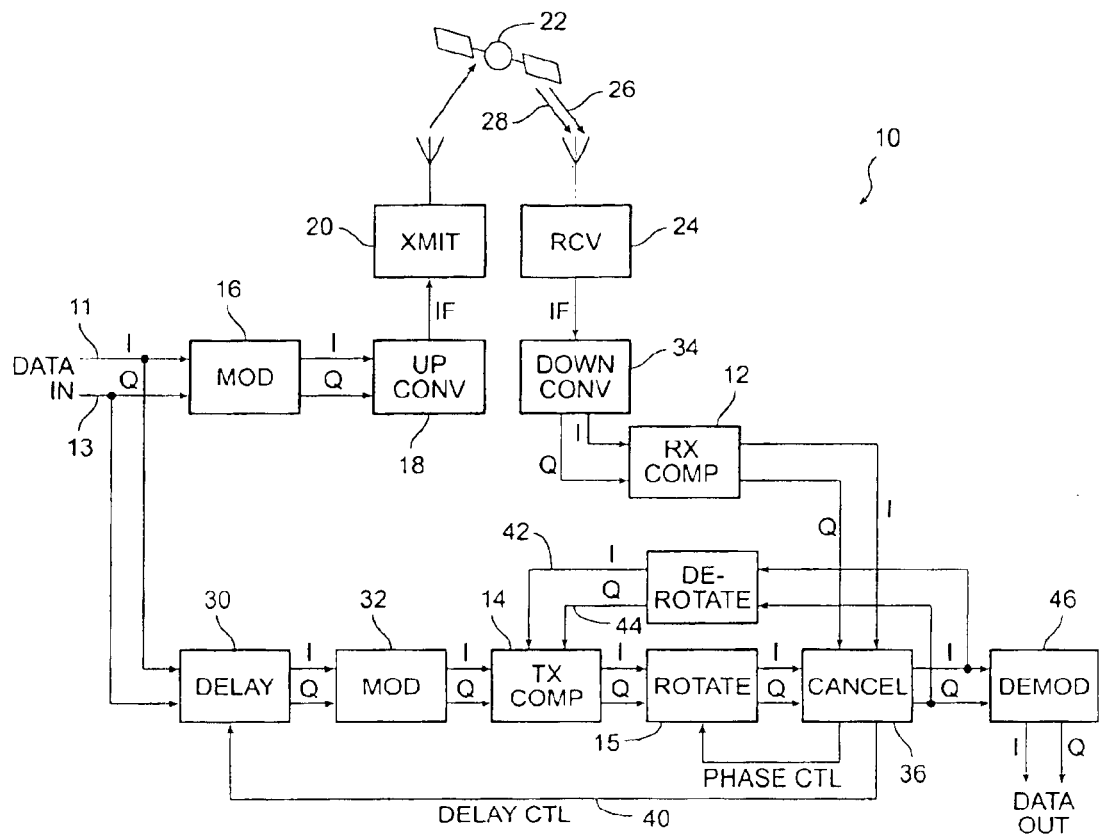
FIG. 1 is a block diagram of a self-interference removal system with converter compensators.

Reference is made to FIG. 1 which shows a self interference removal system 10 with converter compensators 12 and 14 according to the invention. In the overall system, I and Q data 11, 13 are provided to a modulator set 16 (with a modulator for the In-phase component and a modulator for Quadrature-phase component), the outputs of which are directed through an imperfect upconverter set 18, which upconverts and then combines I and Q to deliver an IF signal (mixed I and Q) to a transmitter module 20. The transmitter module 20 broadcasts an RF "own" signal to a relay station (overhead satellite) 22. From the relay station 22, the receiver module 24 receives a composite signal of both an "own" component 26 as modified by any imperfections in the upconverter 18, and a remote component 28, the relay station 22 and the communication channel. The input I and Q 11, 13 are also directed through another path via a time-controlled delay element set 30 to a replica modulation circuit 32, as explained hereafter.

The IF signal from the receiver module 24 is directed to a downconverter 34 which provides I and Q outputs to the receive compensator set 12. It is placed in the receive path between the downconverter 34 and a self-interference canceler set 36. The transmit compensator set 14 is placed in the cancellation generation path after the cancellation modulator 32 but before the self-interference canceller set 36. The transmit compensator 14 feeds I and Q signals to a phase rotator/derotator 15. On the forward path of signals, the element 15 rotates the phase by a controlled amount under feedback control. On the reverse path, I and Q signals from the canceler 36 are derotated by an equivalent amount. The receive compensator set 12 is self contained, while the transmit compensator set 14 relies on a complex error signal that is output from the self-interference canceller set 36 in the form of aderotated I error signal 42 and a derotated Q error signal 44. The the interference canceller set 36 are the I and Q components of the desired signal, which are in turn applied to a demodulator set 46 to produce I data out 48 and Q data out 50.

Figure 2:
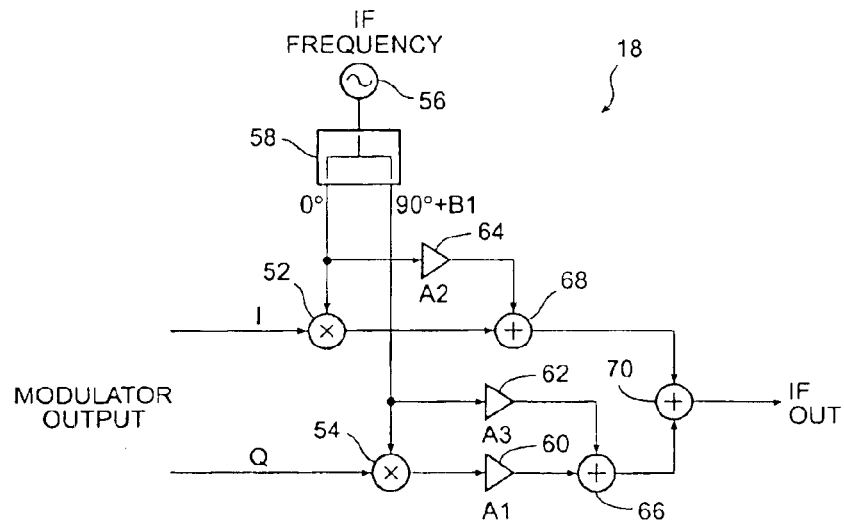
FIG. 2 is a block diagram of an upconverter model according to the invention.

FIG. 2 is a block diagram of a detail according to the invention of a typical upconverter 18. Unlike an ideal upconverter, a typical real upconverter has leakage, imbalances and phase offset. The complex modulator output signals I and Q are input to two multiplicative mixers 52, 54. The designated IF frequency signal is generated by an oscillator 56 and split by a 90 degree (quadrature) splitter 58, which is not perfect. To account for the imperfection, the phase difference between the two signals is designated 90 degrees plus B1. These two approximately quadrature splitter output signals are the other inputs to the two mixers 52, 54 for I and Q.

For the IF output, the mixer outputs for I and Q must be added together. To account for imperfections, three amplifiers 60, 62, 64 are added. The first amplifier 60, with gain A1, is in the Q path to account for and model the amplitude difference between the I and Q signals. This amplitude difference is added at summing junction 66. (It is thus unnecessary to model a amplification of one in the I signal path, since the I signal is considered the reference signal and its magnitude is normalized to 1.) Therefore, in an ideal case, A1=1. Amplifiers 62, 64 with amplifications of A2 and A3 account for the leakage of the IF quadrature signals at baseband into the final IF output through summers 66 and 68. In an ideal upconverter, then, A2=A3=0. The I and Q components are summed in a final summer 70 to produce an IF output. (Not shown is an output filter to remove unwanted harmonic images.) The summers 66, 68, 70 could be modeled as a single four-input summing junction. This model could be used to account for other imperfections in the upconverter by appropriate addition of amplifiers, phase offsets and summers.

Figure 3:
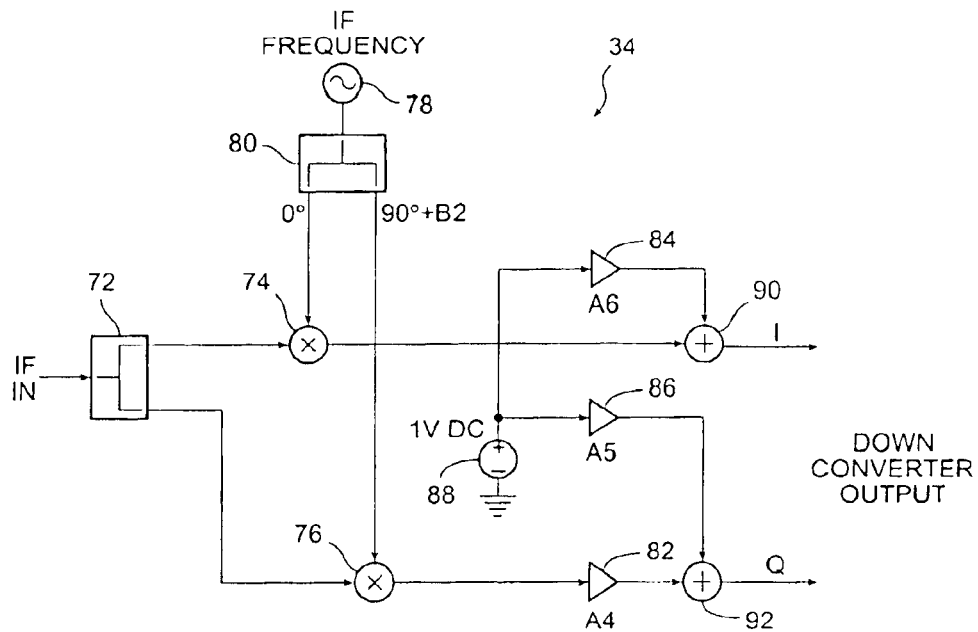
FIG. 3 is a block diagram of a downconverter model according to the invention.

A corresponding downconverter 34 in a self-interference compensating transceiver 10 is shown in FIG. 3. The incoming IF signal from its receiver section is split into two equal phase portions by an analog signal splitter 72 that are sent to two multiplicative mixers 74, 76. The designated receive IF frequency signal is generated by an IF oscillator 78 and split by a 90 degree (quadrature) phase splitter 80. Since the phase splitter 80 does not produce a perfect quadrature phase split, the phase difference between the two signals is formulated as 90 degrees plus B2. These two nearly quadrature signals are the multiplier inputs to the two mixers 74, 76 receiving as inputs the I and Q outputs from the splitter 72. The mixers 74, 76 produce the complex component baseband output. To account for mixer imperfections, three amplifiers 82, 84, 86 are employed. The first amplifier 82, with gain A4, is placed on the Q path to model the amplitude difference between the I and Q signals with the I signal considered to be the reference signal. The gain of the I signal is normalized to 1. Therefore, in an ideal case, A4=1. The amplifiers 84, 86 account for the leakage of the IF quadrature 111 signals into the I and Q outputs from the splitter 72. This leakthrough results in a DC offset of amplitude A5 and A6 (from an arbitrary DC source 88) in the I and Q signals respectively. In an ideal upconverter, A5=A6=0. These offset signals are added into the I and Q signals through summers 90, 92.

Figure 4:
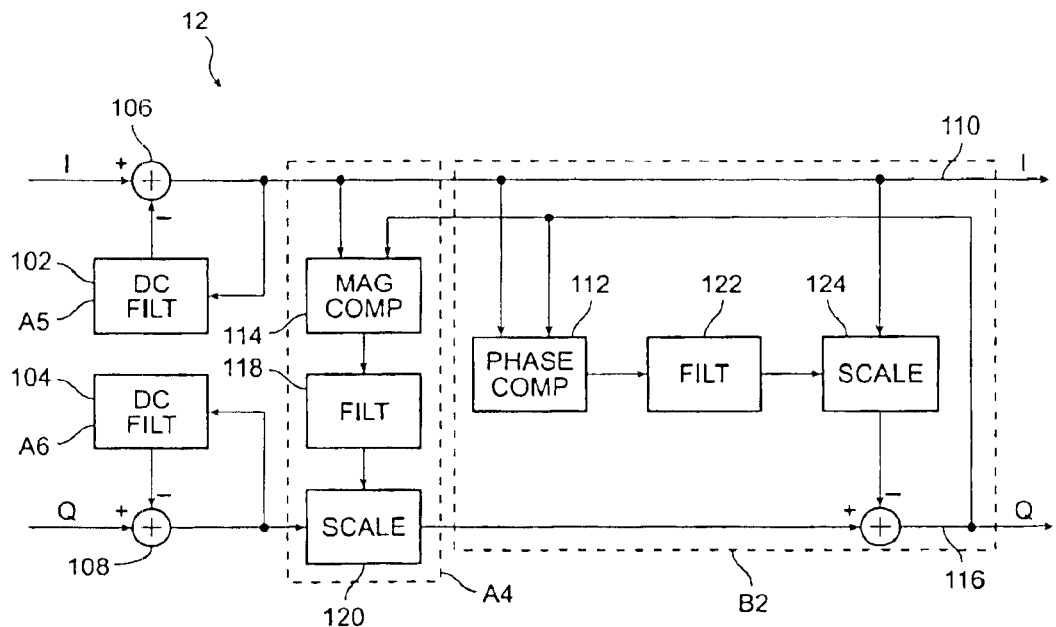
FIG. 4 is a block diagram of a receive compensator according to the invention.

FIG. 4 shows the detail of a receive compensator 12 according to the invention in the receive path. This compensator 12 relies on the statistical properties of the received signal to remove only imperfections introduced by the downconverter 34. Imperfections introduced by the upconverter 18 are not dealt with at this stage. First, the I path and the Q path are treated independently to remove any DC offset that has occurred due to imperfections A5 (I) and A6 (Q) (FIG. 3). DC filters 102, 104 are provided to compensate for A5 and A6 and have a very low cutoff frequency and find the long term average DC levels of the I and Q signals to remove those levels through their respective summers 106, 108.

After the DC is removed from the I path, the I path is not processed further before it is output from the compensator 12. (The I signal path is chosen as the reference, although Q could be chosen equivalently.) This DC compensated reference path (I or equivalently Q signal path if Q is used for the reference path) 110 is also input to one port of a phase comparator 112 and a magnitude comparator 114.

The magnitude comparator 114 compares the I path signal to the Q path signal at its final output 116 from the receive compensator 12. The difference in magnitude drives a low pass filter 118 that finds the long term average value of the difference in magnitude between the I and Q signals at outputs 110, 116. This difference then drives a scaling circuit 120 that adjusts the magnitude of Q appropriately to bring the long term average magnitude difference to zero. Note the Q input of the magnitude comparator is the compensated Q path 1116 since the phase-compensating scale 124 will affect the magnitude of the compensated Q signal. The phase comparator 112 correlates the I path signal 110 with the Q path signal at its final output 116 from the receive compensator 12. The correlation drives a low-pass filter 122 that finds the long-term average component of the I path signal on the Q path signal caused by the quadrature error B2 of the downconverter splitter 80. This correlation component drives a scaling block 124 that adjusts the amount of I path signal 110 that is applied to the Q path signal so that the long-term average correlation between compensated Q path signal 116 and I path signal 110 is zero.

Figure 5:
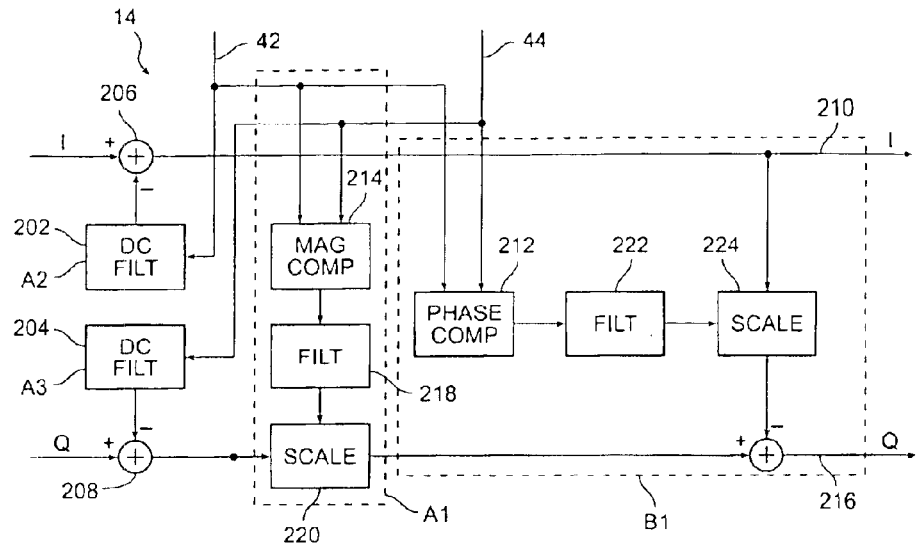
FIG. 5 is a block diagram of a transmit compensator according to the invention.

FIG. 5 is a block diagram of one embodiment of the transmit converter compensator 14 according to the invention. Its structure and function are like that of the receive converter compensator 12, differing in that its error signals for I and Q are the outputs of the cancellation unit 36 (hereinafter described) instead of its own signals.

The transmit compensator 14 relies on the statistical properties of the received signal to replicate imperfections introduced by the upconverter 18 as its signal is transmitted to and received from the remote relay station 22. First, the I path and the Q path are treated independently to insert the DC offset that has occurred due to imperfections A2 (I) and A3 (Q) (FIG. 3). DC filters 202, 204 are provided to compensate for A2 and A3 and have a very low cutoff frequency and find the long term average DC levels of the I and Q signals to produce those levels through their respective summers 206, 208.

After the appropriate DC level is inserted into the I path, the I path is not processed further before it is output from the compensator 14. This DC compensated reference path (I or equivalently Q signal path if used for the reference path) is not further used, except for scaling.

A magnitude comparator 214 compares the I path signal to the Q path signal from cancellation outputs 42, 44 of the cancellation circuit 36. These are designated error signals for I and Q. The difference in magnitude drives a low pass filter 218 that finds the long term average value of the difference in magnitude between the I and Q signals at outputs 42, 44. This difference then drives a scaling circuit 220 that adjusts the magnitude of Q appropriately to bring the long term average magnitude difference to zero. The Q input of the magnitude comparator is not taken directly after the Q branch scaling, but it is taken after the scaling as a result of phase compensation. A final compensator, including phase comparator 212, low-pass filter 222 and scaler 224, adjusts the phase of the Q output signal. This compensation thus also affect the magnitude of the Q signal at output 216, which then is processed by the cancellation circuit and fed back to the magnitude comparator 214 as the Q error signal 217 to achieve proper compensation.

Figure 6:
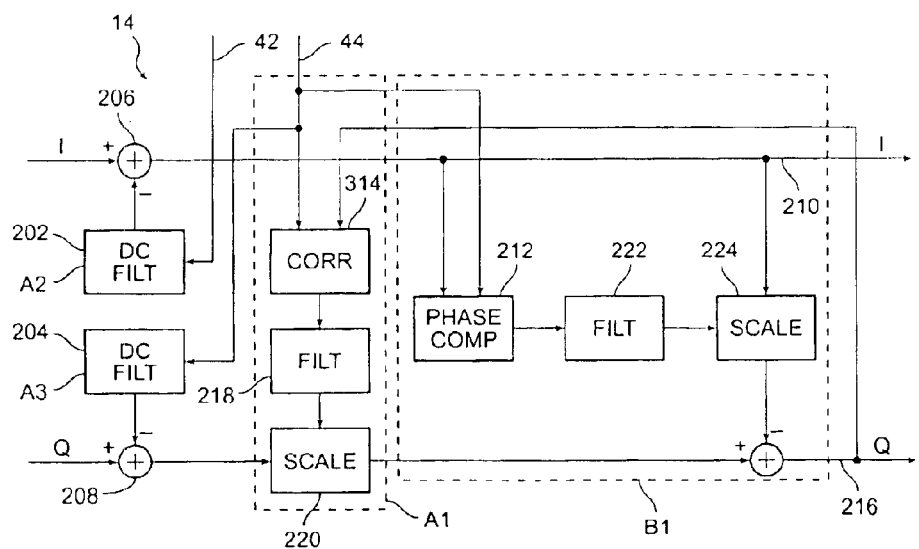
FIG. 6 is a block diagram of a transmit compensator according to the invention.

FIG. 6 is a block diagram of a second embodiment of the transmit converter compensator 14 according to the invention. Its structure and function are similar to that of the transmit converter compensator 14 detailed in FIG. 5, differing in that its error signals for I and Q are used differently as described herein.

As in the embodiment of FIG. 5, the I path and the Q path are treated independently to insert the DC offset that has occurred due to imperfections A2 (I) and A3 (Q) (FIG. 3). DC filters 202, 204 are provided to compensate for A2 and A3 and have a very low cutoff frequency and find the long term average DC levels of the I and Q signals to produce those levels through their respective summers 206, 208.

After the appropriate DC level is inserted into the I path, the I path is not processed further before it is output from the compensator 14. This DC compensated reference path (I or equivalently Q signal path if used for the reference path) is used as input to the phase comparator 212 and for scaling by the scaler 224.

A correlater 314 correlates the Q path signal from the cancellation output 44 to the Q path compensated replica signal on path 216. This correlation drives a low-pass filter 218 that finds the long term average difference in gain between the Q path replica signal on path 216 and the Q path cancellation signal on path 44. This difference then drives a scaling circuit 220 that adjusts the gain of the Q path replica until the long term average gain is equal to the A1 gain of the upconverter model. The phase comparator 212 correlates the I path replica signal on path 210 with the Q path signal on path 44 from the cancellation output. The correlation drives a low-pass filter 222 that finds the long-term average component of the I path replica signal and the Q path cancellation signal on path 44 caused by the quadrature error B1 of the upconverter splitter 58 (FIG. 2). This correlation component then drives a scaling block 224 that adjusts the amount of I path replica signal 210 applied to the Q path replica signal to mimic the correlation of the incoming I and Q signals caused by quadrature error B1. (Because of the delay introduced by cancellation, the input signal to the correlator 314 from path 216 and the input signal to the phase comparator 212 from path 210 must be delayed to maintain time synchronization. These delays are not explicitly shown.) Other error signals could have been used to produce similar results.

Because the transmit compensator 14 is driven by the output signals of the cancellation circuit 36, and not from its own output signals, as in the case of the receive compensator 34, it is able to replicate the degradation introduced by upconverter 18 in the replicated signal input to the cancellation circuit 36.

Figure 7:
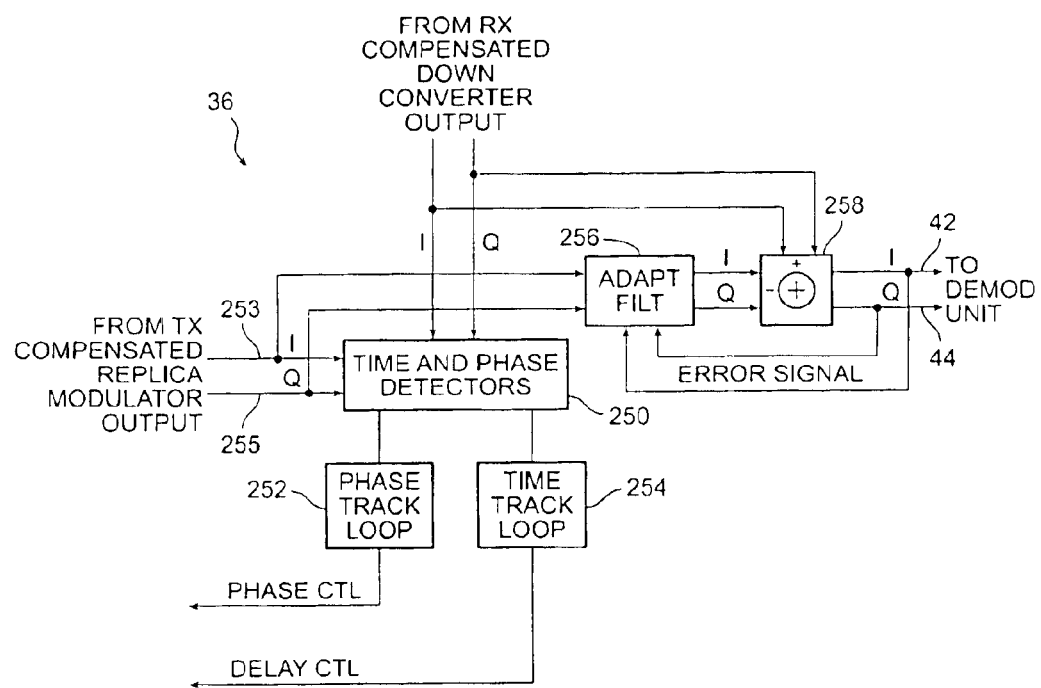
FIG. 7 is a block diagram of a cancellation circuit used in connection with the invention.

Referring now to FIG. 7, the cancellation circuit 36 is illustrated. Its purpose in this context is to take a replica of the modulated signal which has been compensated for upconverter-introduced errors and compare it with a downconverter-compensated received signal and remove the component of that received signal due to the user's own transmission, including upconverter introduced errors. The cancellation circuit 36 finds application in self-interference removal systems employing replica signal generation. The cancellation circuit employs time and phase detectors 250 to correlate the two complex input signals to generate signals to drive phase and time tracking loops 252, 254 that control delay and modulation elements 30, 32. The control of time and phase allow the replica signal to align with that portion of the composite relayed signal attributable to the user's own transmissions (i.e., the user's relayed signal). The replica modulator outputs 253, 255 are provided to an adaptive filter 256. The adaptive filter 256 mimics the linear effects that the user's relayed signal has encountered in the transmission channels via the relay 22. These effects will be present at the output of the receive compensator 12. A summer 258 removes the user-originated signal from the composite signal.

If the canceller 36 is unable to remove all of the user's relayed signal because of the transmission upconverter imperfections, then a portion of the transmitted signal remains in the canceller output. This remnant of the transmitted signal will correlate highly with the delayed and modulated replica of the transmitted signal that has been prepared for the cancellation process. By using the canceller output signal as the input to all the comparators in the transmit compensator 14, then the replica signal can be readily modified to match the imperfections in the originally transmitted signal. The desired signal in the canceller output (destined for the user's demodulator(s)) will not correlate with the transmitted signal replica and will thus be equivalent to noise in the operation of the transmit compensator 14.

A number of techniques can be used to implement the structures of FIG. 4, FIG. 5 and FIG. 6. Some representative examples are illustrated in FIGS. 8A–8D. The outputs of the downconverter 34 can be digitized (through analog to digital converters not shown) so that all subsequent processing can be in the digital domain. The errors introduced by upconversion and downconversion are artifacts of analog processing.

Figure 8A:
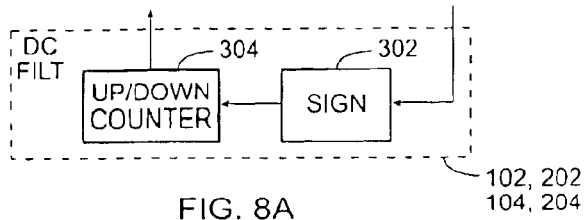
FIGS. 8A–8D are block diagrams of components employed in digital realizations of components of the invention.

Referring to FIG. 8A, the DC filters 102, 104, 202, 204 can be realized digitally as a sign detector 302 followed by a counter 304. Each positive sample increments the counter, while each negative sample decrements the counter. If there is no DC component in the digital representation of the incoming signal, then the long term average of the counter output will be zero. If there is a DC component, however, the value of the counter will go positive or negative to reflect that value. In the application of interest, once the DC value of the incoming signal is achieved at the output of the counter, then the input to the sign detector will have zero DC, and the system will stabilize. The precision of the counter affects the speed of this convergence and the sensitivity to noise.

Figure 8B:
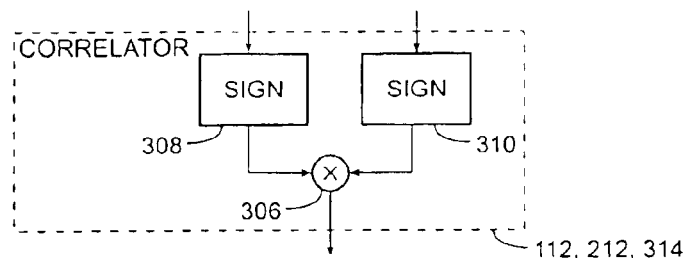

In a similar fashion, referring to FIG. 8B, the phase comparators 112, 212 can be implemented by a correlator fashioned by a multiplier 306 multiplying the signs (elements 308, 310) of the I and Q branches together. In practice, this is accomplished by comparing the sign bits. If the two sign bits are the same, then the output would be +1, while if they differ, the output would be the inverse or −1. The same correlator structure of FIG. 8B is used for the correlator of element 314 (FIG. 6).

Figure 8C:
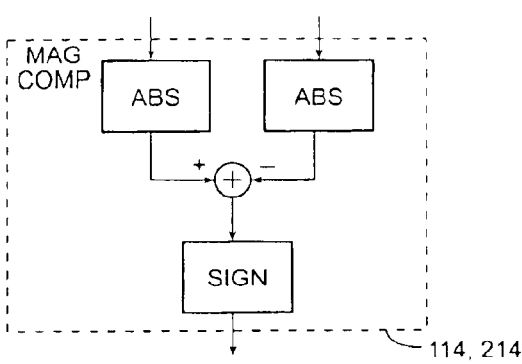
Figure 8D:
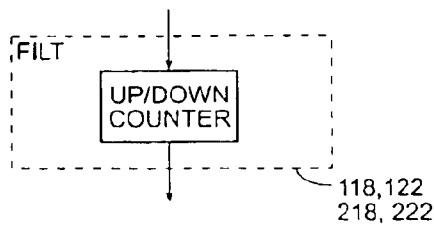

The magnitude comparators 114, 214 can also be implemented with a sign detector arrangement (FIG. 8C). The input to the sign detector is the difference in amplitudes (absolute values) of the I path signal and the Q path signal.

The filters 118, 122, 218, 222 can be implemented by an up/down counter (FIG. 8D) that increments for positive values and decrements for negative values.

This invention is most effective when the communication system employs up/down converters 18, 34 that work fine for regular demodulation, but are not good enough for self-interference cancellation. This includes most legacy systems that employ analog signal processing in the rf sections.

The invention has been explained with reference to specific embodiments. Other embodiments will be evident to those of ordinary skill in the art. It is therefore not intended that this invention be limited, except as indicated by the appended claims.

What is claimed is:

1. In a receiver section of a relayed communication system, a method for removal of self-interference comprising:

modeling downconversion imperfections in an imperfectly downconverted signal from a receiver downconverter in said receiver section operative to receive both an intended signal and a self-generated signal from a local associated transmitter forming a received relayed composite signal;

compensating for said downconversion imperfections in said received relayed composite signal to produce a compensated composite signal; and canceling self-generated signal portions from said compensated composite signal to provide an output signal for demodulation.

2. The method according to claim 1 wherein said receiver downconverter model imperfections include at least one of the following:

quadrature phase offset, quadrature d.c. imbalance, and quadrature amplitude imbalance.

3. The method according to claim 1 wherein said downconversion imperfections compensating step includes comparing at least one of the following:

phase and magnitude of said modulated output signal with corresponding characteristics of said replicated modulated user signal.

4. The method according to claim 1 wherein said downconversion imperfection compensating step includes setting d.c. level based on said modulated output signal.

5. In a receiver section of a relayed communication system, a method for removal of self-interference comprising:

modeling upconversion imperfections in an imperfectly unconverted signal from a transmitter upconverter in a transmitter section local to said receiver section, said transmitter section producing self-generated signals; and compensating for said upconversion imperfections to produce a compensated composite signal from a received relayed composite signal containing a representation of said imperfectly unconverted signal; while canceling said self-generated signal portions from said compensated composite signal to provide an output signal for demodulation.

6. The method according to claim 5 wherein said compensating step and said canceling step are based on a representation of said self-generated signal and said received relayed composite signal.

7. The method according to claim 6 wherein said representation of said self-generated signal is a delayed replicated self-generated signal.

8. The method according to claim 5 wherein said transmitter upconverter model imperfections include at least one of the following:

quadrature phase offset, quadrature d.c. imbalance, and quadrature amplitude imbalance.

9. The method according to claim 5 wherein said upconversion imperfection compensating step includes setting d.c. level based on said modulated output signal.

10. The method according to claim 5 wherein said upconversion imperfections compensating step includes comparing at least one of the following:

phase and magnitude of said modulated output signal with corresponding characteristics of said replicated modulated user signal.

11. The method according to claim 5 wherein said upconversion imperfections compensating step includes comparing phase of said modulated output signal with corresponding characteristics of said replicated modulated user signal.

12. The method according to claim 5 wherein said upconversion imperfections compensating step includes correlating said modulated output signal with said replicated modulated user signal.

13. The method according to claim 12 wherein said correlating is among any two quadrature components.

14. A method for self-interference removal in a relayed communication system comprising:

providing a model of an imperfect receiver downconverter;

compensating for downconversion imperfections in an imperfectly downconverted signal from said imperfect receiver downconverter at the output of said receiver downconverter to remove said downconversion imperfections to produce a compensated composite signal;

providing a model of an imperfect transmitter upconverter;

replicating a modulated user signal using as input a user baseband signal to produce a replicated modulated user signal;

compensating for upconversion imperfections in an imperfectly unconverted signal from said imperfect transmitter upconverter on said replicated modulated user signal to remove said upconversion imperfections to produce a compensated replicated modulated user signal; and canceling said compensated replicated modulated user signal from said compensated composite signal to provide a modulated output signal.

15. The method according to claim 14 wherein said receiver downconverter model imperfections include at least one of the following:

quadrature phase offset, quadrature d.c. imbalance, and quadrature amplitude imbalance.

16. The method according to claim 14 wherein said transmitter upconverter model imperfections include at least one of the following:

quadrature phase offset, quadrature d.c. imbalance, and quadrature amplitude imbalance.

17. The method according to claim 14 wherein said receiver downconverter model imperfections include at least one of the following:

quadrature phase offset, quadrature d.c. imbalance, and quadrature amplitude imbalance; and wherein said transmitter upconverter model imperfections include at least one of the following:

quadrature phase offset, quadrature d.c. imbalance, and quadrature amplitude imbalance.

18. The method according to claim 14 wherein said upconversion imperfection compensating step includes setting d.c. level based on said modulated output signal.

19. The method according to claim 14 wherein said upconversion imperfections compensating step includes comparing at least one of the following:

phase and magnitude of said modulated output signal with corresponding characteristics of said replicated modulated user signal.

20. The method according to claim 14 wherein said downconversion imperfection compensating step includes setting d.c. level based on output level of said downconverter.

21. The method according to claim 20 wherein said downconversion imperfections compensating step includes comparing at least one of the following:

phase and magnitude of the output of said downconverter with corresponding characteristics of said compensated composite signal.

22. The method according to claim 14 wherein said upconversion imperfections compensating step includes comparing phase of said modulated output signal with corresponding characteristics of said replicated modulated user signal.

23. The method according to claim 14 wherein said upconversion imperfections compensating step includes correlating said modulated output signal with said replicated modulated user signal.

24. The method according to claim 23 wherein said correlating is among any two quadrature components.

25. An apparatus for removal of self-interference in a relayed communication system comprising:

a first compensator for compensating for downconversion imperfections in an imperfectly downconverted signal from said imperfect receiver downconverter at the output of said receiver downconverter to remove said downconversion imperfections in said imperfectly downconverted signal to produce a compensated composite signal;

a replicator for replicating a modulated user signal using as input a user baseband signal to produce a replicated modulated user signal;

a second compensator for compensating for upconversion imperfections in an imperfectly unconverted signal from said imperfect transmitter upconverter on said replicated modulated user signal to remove said upconversion imperfections to produce a compensated replicated modulated user signal; and a canceller for canceling said compensated replicated modulated user signal from said compensated composite signal to provide a modulated output signal.

26. In a receiver section of a relayed communication system, an apparatus for removal of self-interference comprising:

a compensator for compensating for said downconversion imperfections in a received relayed imperfectly downconverted composite signal to produce a compensated composite signal; and a canceler for canceling self-generated signal portions from said compensated composite signal to provide an output signal for demodulation.

27. In a receiver section of a relayed communication system, an apparatus for removal of self-interference comprising:

a compensator for compensating for said upconversion imperfections in an imperfectly unconverted signal to produce a compensated composite signal; and a canceller for canceling self-generated signal portions from said compensated composite signal to provide an output signal for demodulation.

* * * * *

UNITED STATES PATENT AND TRADEMARK OFFICE
CERTIFICATE OF CORRECTION

PATENT NO.        : 6,996,164 B1
APPLICATION NO.   : 10/051887
DATED             : February 7, 2006
INVENTOR(S)       : Richard N. Blount, Donald W. Becker and John H. O'Neill Page 1 of 2

It is certified that error appears in the above-identified patent and that said Letters Patent is hereby corrected as shown below:

In the Claims

Claim 1, Column 7, line 16, delete "and".

Claim 1, Between Column 7, line 16, and Column 7, line 17, insert --matching phase and amplitude of a portion of said compensated composite signal to a local representation of said self-generated signal; and--.

Claim 1, Column 7, line 17, after "canceling" insert --said--.

Claim 3, Column 7, lines 25 to 26, delete "downconversion imperfections".

Claim 3, Column 7, line 26, delete "step".

Claim 4, Column 7, line 31, cancel the text beginning with "4. The method according" and ending with "output signal." in Column 7, line 33, and insert the following claim:
   --4. In a receiver section of a relayed communication system, a method for removal of self-interference comprising:
      modeling downconversion imperfections in an imperfectly downconverted signal from a receiver downconverter in said receiver section operative to receive both an intended signal and a self-generated signal from a local associated transmitter forming a received relayed composite signal;
      compensating for said downconversion imperfections in said received relayed composite signal to produce a compensated composite signal;
      canceling said self-generated signal portion from said compensated composite signal to provide an output signal for demodulation; wherein said compensating includes setting d.c. level based on said modulated output signal.--

Claim 5, Column 7, line 38, delete "unconverted" and insert --upconverted--.

Signed and Sealed this
Fourth Day of February, 2014

Michelle K. Lee
*Deputy Director of the United States Patent and Trademark Office*

CERTIFICATE OF CORRECTION (continued)
U.S. Pat. No. 6,996,164 B1

Claim 5, Column 7, line 40, after "producing" please insert --a--.

Claim 5, Column 7, line 40, delete "signals" and insert --signal--.

Claim 5, Column 7, line 45, delete "unconverted" and insert --upconverted--.

Claim 5, Column 7, line 46, delete "portions".

Claim 6, Column 7, line 50, delete both occurrences of "step".

Claim 9, Column 7, line 62, delete "step".

Claim 10, Column 7, line 65, delete "step".

Claim 14, Column 8, line 20, delete "the output of".

Claim 14, Column 8, line 20, after "said" insert --imperfect--.

Claim 14, Column 8, line 29, delete "unconverted" and insert --upconverted--.

Claim 18, Column 8, line 57, delete "step".

Claim 19, Column 8, line 60, delete "step".

Claim 20, Column 8, line 66, delete "step".

Claim 21, Column 9, line 2, delete "step".

Claim 22, Column 9, line 8, delete "step".

Claim 23, Column 9, line 13, delete "step".

Claim 25, Column 9, line 22, delete "said" and insert --an--.

Claim 25, Column 9, line 23, insert --imperfect-- before "receiver".

Claim 25, Column 9, line 31, delete "unconverted" and insert --upconverted--.

Claim 25, Column 10, line 1, delete "said" and insert --an--.

Claim 26, Column 10, line 13, after "signal" insert --in an imperfect receiver downconverter--.

Claim 26, Column 10, line 15, delete "canceler" and insert --canceller--.

Claim 27, Column 10, line 22, delete "unconverted" and insert --upconverted--.

Claim 27, Column 10, line 22, after "signal" insert --of an imperfect transmitter upconverter--.